United States Patent
Havekes et al.

(10) Patent No.: US 9,948,999 B2
(45) Date of Patent: Apr. 17, 2018

(54) VIDEO PROCESSING SYSTEM AND METHOD

(71) Applicant: Nederlandse Organisatie voor toegepast- natuurwetenschappelijk onderzoek TNO, 's-Gravenhage (NL)

(72) Inventors: Anton Havekes, 's-Gravenhage (NL); Johannes Gerardus Maria Schavemaker, 's-Gravenhage (NL)

(73) Assignee: Nederlandse Organisatie voor toegepast- natuurwetenschappelijk onderzoek TNO, The Hague (NL)

( * ) Notice: Subject to any disclaimer, the term of this patent is extended or adjusted under 35 U.S.C. 154(b) by 0 days.

(21) Appl. No.: 14/782,466

(22) PCT Filed: Apr. 7, 2014

(86) PCT No.: PCT/NL2014/050217
§ 371 (c)(1),
(2) Date: Oct. 5, 2015

(87) PCT Pub. No.: WO2014/163505
PCT Pub. Date: Oct. 9, 2014

(65) Prior Publication Data
US 2016/0073179 A1      Mar. 10, 2016

(30) Foreign Application Priority Data
Apr. 5, 2013 (EP) ................................... 13162585

(51) Int. Cl.
*H04N 21/8549* (2011.01)
*H04N 21/2365* (2011.01)
(Continued)

(52) U.S. Cl.
CPC ..... *H04N 21/8549* (2013.01); *G06K 9/00724* (2013.01); *G06T 7/11* (2017.01);
(Continued)

(58) Field of Classification Search
CPC ........... H04N 21/8549; H04N 21/2365; H04N 21/4223; H04N 21/44008; H04N 21/8133;
(Continued)

(56) References Cited

U.S. PATENT DOCUMENTS

| 2002/0159637 A1* | 10/2002 | Echigo | ............... G06F 17/30905 382/190 |
| 2008/0138029 A1* | 6/2008 | Xu | ........................ H04N 21/854 386/228 |

(Continued)

OTHER PUBLICATIONS

International Search Report dated Jul. 25, 2014 for Appln. No. PCT/NL2014/050217.
(Continued)

*Primary Examiner* — Randy Flynn
(74) *Attorney, Agent, or Firm* — Pillsbury Winthrop Shaw Pittman, LLP

(57) ABSTRACT

The video processing system provides for automatic selection of video sequences showing goals in a video stream from cameras directed at a playing field. Classification is applied to image content from different foreground positions in an image. The set of classes comprising a first and second class corresponding players of different teams. Medians or averages of the image positions of the local image content assigned to the first and second class are determined. A condition is tested whether the results are on mutually opposite sides of a reference position and a distance between collected positions or distances between the reference position and the first and second collected positions exceed a threshold value. When the test shows that the condition is met, a preceding video sequence is selected, for example for display.

14 Claims, 2 Drawing Sheets

(51) Int. Cl.

| | |
|---|---|
| *H04N 21/4223* | (2011.01) |
| *H04N 21/44* | (2011.01) |
| *H04N 21/81* | (2011.01) |
| *H04N 21/845* | (2011.01) |
| *G06K 9/00* | (2006.01) |
| *G06T 7/20* | (2017.01) |
| *G06T 7/11* | (2017.01) |
| *H04N 5/247* | (2006.01) |
| *H04N 5/77* | (2006.01) |
| *H04N 7/18* | (2006.01) |

(52) U.S. Cl.
CPC ............... *G06T 7/20* (2013.01); *H04N 5/247* (2013.01); *H04N 5/772* (2013.01); *H04N 7/181* (2013.01); *H04N 21/2365* (2013.01); *H04N 21/4223* (2013.01); *H04N 21/44008* (2013.01); *H04N 21/8133* (2013.01); *H04N 21/8456* (2013.01); *G06K 2009/00738* (2013.01)

(58) Field of Classification Search
CPC .... H04N 21/8456; H04N 5/247; H04N 5/772; H04N 7/181; G06K 9/00724; G06K 2009/00738; G06T 7/20; G06T 7/0081
See application file for complete search history.

(56) References Cited

U.S. PATENT DOCUMENTS

| | | | | |
|---|---|---|---|---|
| 2008/0192116 A1* | 8/2008 | Tamir | ................... | G06T 7/2093 348/157 |
| 2009/0059007 A1* | 3/2009 | Wagg | .................... | G06T 7/2046 348/157 |
| 2009/0060352 A1* | 3/2009 | Distante | ................ | G06T 7/0042 382/224 |
| 2010/0026801 A1* | 2/2010 | Williams | .................. | G06T 7/20 348/135 |
| 2010/0157022 A1* | 6/2010 | Choi | ................. | H04N 5/23203 348/48 |
| 2011/0169959 A1* | 7/2011 | DeAngelis | ............. | H04N 5/262 348/157 |
| 2012/0162435 A1 | 6/2012 | Elangovan et al. | | |
| 2012/0188452 A1* | 7/2012 | Keiser | .................. | H04N 5/2224 348/559 |
| 2013/0148861 A1* | 6/2013 | Ferlatte | .............. | G06K 9/00724 382/107 |

OTHER PUBLICATIONS

Assfalg et al.; "Sematic annotation of soccer videos: automatic highlights identification" Computer vision and image understanding, academic press, US. vol. 92, No. 2-3, Nov. 1, 2003, pp. 285-305.
Bertini et al.; "Highlights modeling and detection in sports videos", Pattern analysis and applications, Springer-Verlag, L., vol. 7, No. 4, Dec. 1, 2004, pp. 411-421.
Dalal & Triggs, "Histograms of Oriented Gradients for Human Detection"; 2005, pp. 1-8.
Tijs Rokers & Simon Gleave, "Als doelpunten ruis zijn, wat is dan het signaal?", De Volkskrant, Mar. 6, 2013; pp. 1-2, www.volkskrant.nl/vk/nl/12224/Voetbalblog-De-Zestien/article/detail/3404765/2013/03/06/Als-doelpunten-ruis-zijn-wat-is-dan-het-signaal.dhtml.
Dollar et al, The Fastest Pedestrian Detector in the West, 2010, pp. 1-11.
F. Burgers: 'Football match event detection using player posture and player group classification', MSc thesis, Dec. 2012, pp. 1-75.
Felzenszwalb, et al., "Object detection with discriminatively trained part-based models", IEEE Transactions on Pattern Analysis and Machine Intelligence, vol. 32, No. 9, Sep. 2010, pp. 1627-1645.
D. M. Gavrila, "A Bayesian, Exemplar-based Approach to Hierarchical Shape Matching", IEEE Transactions on Pattern Analysis and Machine Intelligence, vol. 29, No. 8, Aug. 2007, pp. 1-14.
Keller et al., "A New Benchmark for Stereo-based Pedestrian Detection", Proc. of the IEEE Intelligent Vehicles Symposium, Baden-Baden, Germany, 2011, pp. 1-6.
Migdal et al., "Background subtraction using markov thresholds". In Application of Computer Vision. WACV/MOTION'05, vol. 1, 2005, pp. 58-65.
Rodriguez et al., "Detecting and segmenting humans in crowded scenes", In Proceedings of the 15th international conference on Multimedia, Multimedia '07, New York, NY, USA, Sep. 23-28, 2007, pp. 353-356.
Yilmaz et al., "Object tracking: A survey". ACM Computing Surveys., vol. 38, No. 4, Dec. 2006, pp. 1-45.

* cited by examiner

VIDEO PROCESSING SYSTEM AND METHOD

CROSS-REFERENCE TO RELATED APPLICATIONS

This is the U.S. National Stage of PCT/NL2014/050217, filed Apr. 7, 2014, which in turn claims priority to European Application No. 13162585.7, filed Apr. 5, 2013, the entire contents of both applications being incorporated herein by reference in their entireties.

FIELD OF THE INVENTION

The invention relates to a video processing system, a video play system and a video retrieval system comprising such a video system, and a video processing method and video play and retrieval methods.

BACKGROUND

Automated extraction of significant clips from soccer video is known from an article by Assfalg et al, titled "Semantic annotation of soccer videos: automatic highlights identification" and published in Computer Vision and Image Understanding Vol. 92, pages 285-305.

Assfalg et al consider automatic detection of highlights based on the estimation of visual cues indications of state transitions in a finite state machine model of soccer game progress. One proposed visual cue is the localization of players.

Assfalg et al note that the distribution of the players' positions in specific regions of the playing field to detect placed kicks such as kick-offs. Since different types of placed kicks exhibit different players' deployments, the distribution of the players' positions in specific regions provides useful information in order to recognize the type of placed kick. Assfalg et al suggest to detect a cue for a kick-off by forming clusters of players' blobs based on their colors, and checking whether the clusters' bounding boxes are almost completely separated by the midfield line.

However the use of blob clustering, which has to be performed for many images if no cues are to be missed, adds to the computational burden and time needed to detect events. This could prevent a real time response to soccer video.

SUMMARY

Among others, it is an object to provide an improved method to select video segments.

An automated method of selecting a trigger image from series of images according to claim 1 is provided. The series of images may contain all successive images from a camera or a temporally sub-sampled selection from these images. In this method machine classification of local image content from different foreground positions in the image to different classes is used. The foreground positions may have been selected by image segmentation, or by pattern recognition, stereo image processing etc. In an embodiment, the local image content may be aggregate image data from respective foreground image regions that have been determined by image segmentation, each foreground image region corresponding to a different one of the positions. The aggregate image data for a foreground image region may be an average of pixel values of pixels in the image region for example, or a histogram of such pixel values, the pixel value of some pixel in the foreground region etc. Herein a pixel value may be a color vector, or a single value. In another embodiment the local image content may be an individual pixel value.

The local image content is used to assign the different positions to selected ones of the classes. A first and second collected position are determined for the first and second class, using a median or average of the image positions of the local image content assigned to the first and second class respectively. The collected positions are used to detect whether a condition is met that the first and second collected positions are on mutually opposite sides of a reference position and a distance between collected positions or distances between the reference position and the first and second collected positions exceed a threshold value. When a two dimensional collected position is used, each distance may optionally be determined from a component, along a predetermined direction, of a vector to the collected position from the reference position or from the other collected position. When the condition is met for an image, this image is used as a trigger image. In a further embodiment detection whether said condition is met for at least a predetermined fraction of the images for image time points in a time interval may be used as the condition. In this embodiment the detection may be associated with an image for a time point in the time interval, e.g. the image for the first or last time point in the time interval. As an expansion of the condition it may be tested whether an amount of motion in the image has exceeded a predetermined value prior to the time point of the detected image, or that the amount of motion has decreased by more than a threshold prior to the detected image.

In an embodiment amounts of motion in first and second parts of the images for time points preceding the time point of the trigger image are determined. Herein the first and second parts show different parts of a playing field, e.g. regions containing the goals. A detection is performed whether the amount of motion in the first part exceeds the amount of motion in the second part or vice versa. This detection can be used to decide which side has scored and to maintain a score count.

In an embodiment a kick off after a change of sides may be detected, by testing whether the relative aggregate positions of the first and second classes have been reversed, that is, whether if the aggregate position of the first class is larger than that of the second class in the current trigger image, the reverse was true in a preceding trigger image. Such a detection may be used to assist maintenance of the score count by preventing that the score count is changed for such trigger images.

The trigger image may be used for example to trigger play of a video clip that contains images from a time interval prior to the trigger image, or to trigger transmission of a message, which may optionally contain image data from such a time interval. In an embodiment, the video clip may be played from a video storage system in response to detection of the trigger image and rendered on a display screen. The video clip may be played as an interruption of another image stream, such as a received broadcast stream or a stream of prestored images. In a further embodiment further pre-stored image data may be played in combination with the video clip, a selection between different pre-stored image data being made dependent on image content at a time of the trigger image, or in a time interval adjacent to, or including that time point. In another embodiment the trigger image may be used to trigger retention of the video clip in a video storage system.

In an embodiment image streams are captured from a plurality of cameras directed at a same playing area. In this embodiment images from the image stream from a first camera of said plurality are used to select the trigger image. The first camera may have a field of view that includes the middle line of the playing field midway between opposite goal areas, and parts of the field on both sides of that line. Subsequently a video clip is extracted that contains a part of the image stream from a second camera captured in a time interval preceding a time point at which the trigger image was captured. The second camera may have a field of view that includes one of the goal areas of the playing field.

In an embodiment the video clip being extracted from a combined image stream generated by switching between different ones of the cameras as source of image stream based on a content of the image streams prior to the time point of the trigger image.

Detection of the trigger image may be performed using components that are also used to select the source cameras of the combined image stream.

A computer program product for performing the method is provided. The computer program product, which may be a computer readable medium such as an optical or magnetic disk or a semi-conductor memory, comprises a program of instructions for a programmable computer system that, when executed by the programmable computer system, will make the programmable computer system execute the method.

According to another aspect a video processing system is provided with a classifier for classifying local image content, a position collector, configured to determine a median or average of the image positions of the local image content assigned to a first and second class respectively, and a detector to detect a trigger image if a condition is met that the first and second collected positions are on mutually opposite sides of a reference position and a distance between collected positions or distances between the reference position and the first and second collected positions exceed a threshold value.

The video capture system may comprise a selection module configured to select respective ones of the cameras as sources of images for successive image time points, based on content of the image streams, the video storage system being configured to play the video clip using the images from the cameras selected for the image time points in the video clip, or to make the video clip available for display on demand e.g. using twitter, or transmit the video clip. Making the video clip available for display on demand may comprise transmitting signals to devices that are capable of rendering the video clip when a trigger image has been detected. The camera selection will be referred to as focus selection, i.e. selection of a camera that will be used for a special purpose, distinguished from other cameras.

BRIEF DESCRIPTION OF THE DRAWING

These and other objects and advantageous aspects will become apparent from a description of exemplary embodiments, with reference to the following figures.

DETAILED DESCRIPTION OF EXEMPLARY EMBODIMENTS

Figure 1:
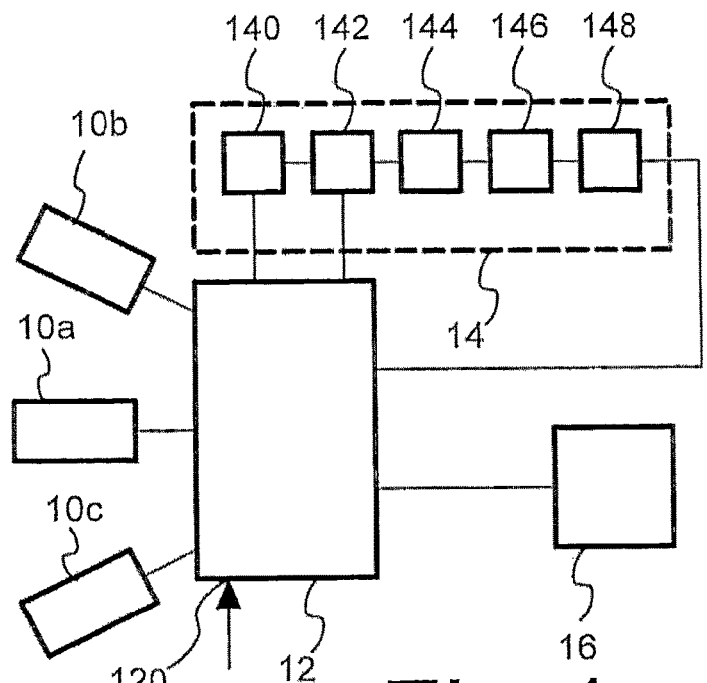
FIG. 1 shows a video system.

FIG. 1 shows a video system, comprising a plurality of cameras 10a-c, a video storage system 12 and a video processing system 14. By way of example a display system with a video display 16 is shown. Video storage system 12 has inputs coupled to cameras 10a-c. Video processing system 14 is coupled to video storage system 12, for receive images from first camera 10a. Although an embodiment is shown wherein video processing system 14 receive images from first camera 10a via video storage system 12, it should be appreciated that instead a direct connection first camera 10a to video processing system 14 may be used, and/or video storage system 12 may receive images from video processing system 14 instead of directly from cameras 10a-c. In the illustrated embodiment, video storage system 12 has an output coupled to video display 16. Video storage system 12 has an optional input 120 for receiving image data from an external source.

In an example of operational deployment, cameras 10a-c are directed at different sub-areas of a soccer playing field. The field of view of first camera 10a contains the middle line of the playing field, including parts of the playing field on mutually opposite sides of that middle line in the field of view. A second and third camera 10b,c may have fields of view that include the penalty area and the goals on opposite sides of the playing field respectively.

A schematic organization of video processing system 14 is shown, comprising an image segmentation module 140, a segment parameter extractor 142, a classifier 144, a position collector 146 and a detector 148 coupled in series. As shown by way of illustration, image segmentation module 140 and segment parameter extractor 142 receive image data separately from video storage system, but video processing system 14 may furthermore comprise an image memory (not shown), which image segmentation module 140 and segment parameter extractor 142 may use to access data from an image. Alternatively image segmentation module 140 and segment parameter extractor 142 may have their own image memories for this purpose. Detector 148 is coupled to video storage system 12.

Video processing system 14 may comprise a programmable computer, or a combination of computers with a program or programs to make it perform operations of the various components of shown in the figure, as described in the following. A computer program product such as a magnetic or optical disk, or a semi-conductor memory may be provided which stores these programs. As used herein, for the embodiment with the programmable computer or computers, statements that video processing system 14, or a component of video processing system 14 is configured to perform operations, or that video processing system 14 performs operations, mean that the program contains instructions to make the programmable computer do so. Alternatively, video processing system 14 may be configured to perform the operation under control of dedicated circuits. In operation streams of video data from cameras 10a-c are stored in video storage system 12 and optionally played to video display 16, i.e. retrieved from video storage system 12 and output to video display 16 in a form to make video display 16 render the images. In addition to video data from cameras 10a-c, video storage system 12 may play other data to video display 16, such as locally stored commercials and/or received data such as a TV program stream obtained using external input 120.

Figure 2:
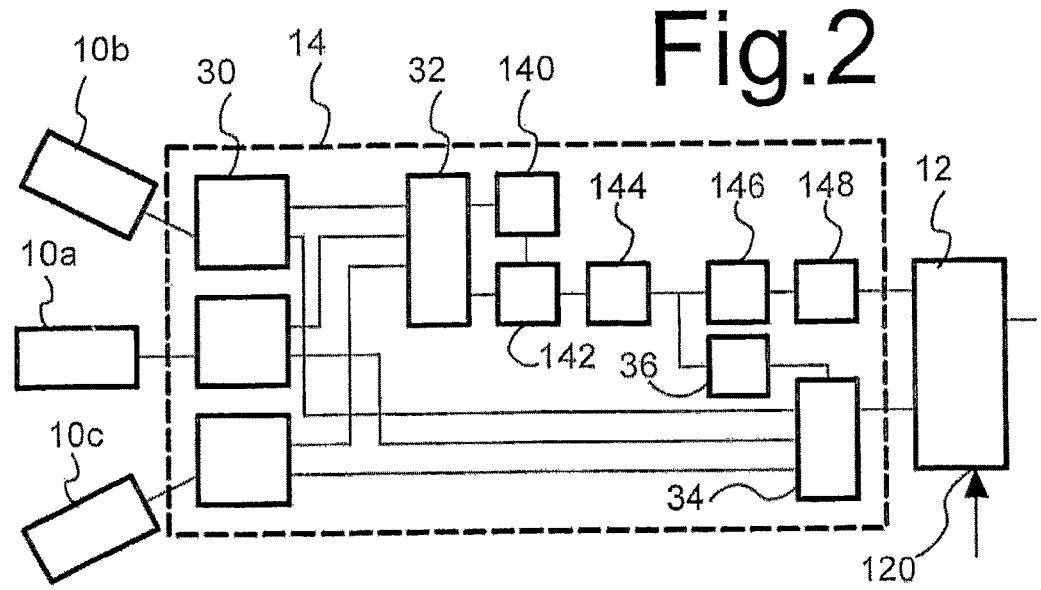
FIG. 2 shows a video system.

FIG. 2 shows an alternative embodiment, wherein cameras 10a-c are coupled directly to video processing system 14 and video processing system 14 supplies image data to video storage system. In this embodiment image segmentation module 140 and segment parameter extractor 142 process images from all cameras 10a-c and the output of classifier 144 is coupled to a focus selection module 36, which used classification results to select for each image time point in a combined video stream from which of cameras 10*a-c* an image will be used. In this embodiment video processing system 14 comprises image memories for different ones of cameras 10*a-c* (only one image memory 30 labeled) and multiplexers 32, 34. Although separate image memories 30, it should be appreciated that instead one memory with storage areas for images from different cameras may be used, and that the function of multiplexers 32, 34 may be performed by selection between these storage areas. A first multiplexer 32 serves to supply images from different cameras 10*a-c* to image segmentation module 140 and segment parameter extractor 142. A second multiplexer 34 serves to provide image storage system 12 with images from the cameras 10*a-c* selected by focus selection module 36, for storing data representing the selected images. Although image segmentation module 140 and segment parameter extractor 142 may process all images from all cameras 10*a-c*, this is not essential: alternatively they may process temporally sub-sampled selections of the images. This reduces processing load and it may also reduce the amount of image memory that needs to be used.

Video processing system 14 at least partly controls selection of images that will be displayed by video display 16. Video processing system 14 processes images from first camera 10*a*, in order to make a dynamically changing selection of one of the cameras 10*a-c* from which the images will be fed to video display 16. In order to do so, video processing system 14 processes images from first camera 10*a*, in order to detect a predetermined type of event. Upon detection video processing system 14 triggers video storage system 12 to play selected video data to video display 16.

Figure 3:
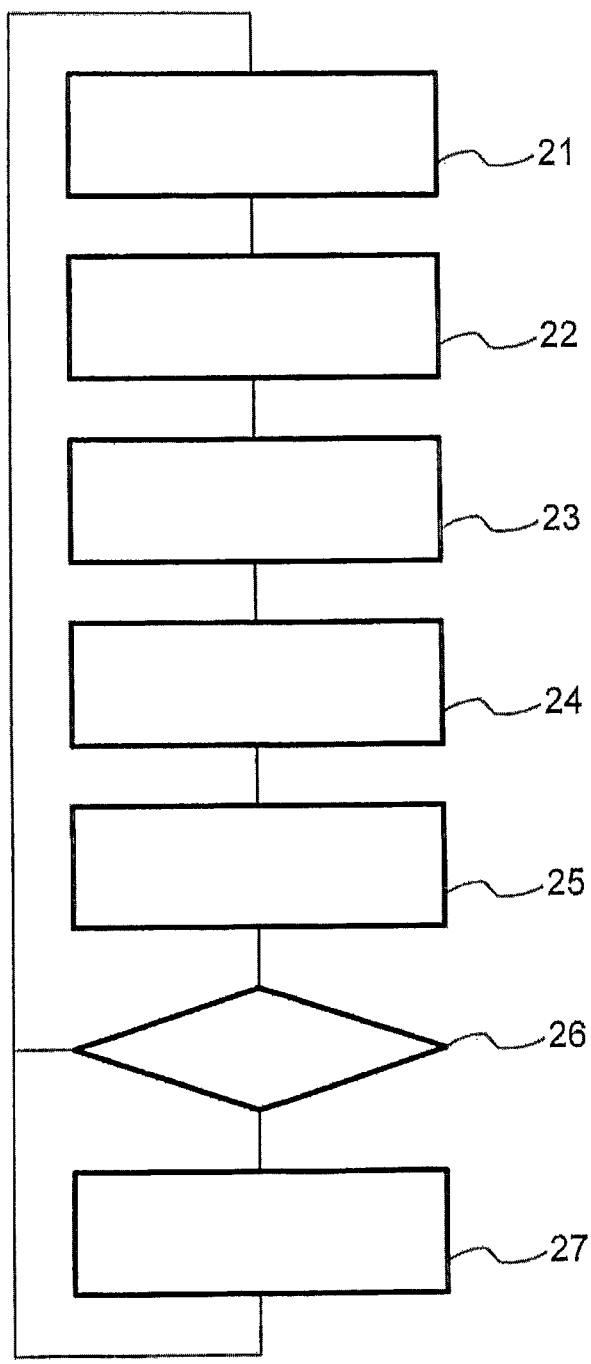
FIG. 3 shows a flow chart of a trigger image selection.

FIG. 3 shows a flow chart of image processing by video processing system 14. In a first step 21, video processing system 14 receives data representing an image obtained by first camera 10*a*. The steps of the flow-chart may be executed for all images captures by first camera 10*a*. However, in an embodiment the steps may be executed for a sub-samples set of these images, e.g. for one image per second. In a second step 22, image segmentation module 140 segments the image. Segmenting, also called segmentation, for which segmentation algorithms are known per se, comprises selecting regions of locations in the image on the basis of image content.

In a simple form of segmentation, a region may be selected by identifying pixels in the image that have a property value within a property value range defined for the region, such as a pixel value in a pixel value range defined for the region, and determining a region of pixel locations of such pixels, by selecting pixel locations that are each a neighbor of at least one other pixel location in the region. Segmentation may be used to identify foreground regions and a background region surrounding the foreground regions. The background region may correspond to a part of the image shows a playing field for example, and a number of foreground regions may correspond to parts of the image that show players.

Other forms of segmentation that may be used include recognition based segmentation. An exemplary form of recognition comprises computing histograms of image value gradients for each of a plurality of image blocks in the image, computing values of a distance measure between the computed histogram and respective reference histograms, and identifying the block as a foreground region or not dependent on the computed differences, for example using a support vector machine, which is known per se. Herein the reference histograms may be derived from training examples.

Another example of recognition is shape matching, which may involve detecting edges in the image, or determining gradients, and comparing the detected edges or gradient of each region of the image with reference contours and identifying the region as a foreground region dependent on computed match scores with the reference contours.

Other forms of segmentation that may be used are based on measurements to determine a deviation from background depth. Stereo image processing may be used for example. This may be realized for example by measuring disparity between the image and one or more further images obtained simultaneously by one of more further cameras (not shown) directed at a same part of the field as first camera 10*a*, from a different camera position.

In this form of segmentation a map of pixel locations may be used, that define, for each of a plurality of pixel positions in the image from first camera 10*a*, pixel positions in each of the one or more further images, where a same position on the playing field is visible. In this form of segmentation pixel positions in foreground regions may be determined by detecting whether the pixel value at those positions from first camera 10*a* differ by more than a threshold amount from the pixel values of the mapped pixel position in the one or more images from the further cameras. A direct comparison of pixel values may be used, but alternatively a pixel value mapping may be defined, to compute a pixel value to be compared for a camera from a pixel value of another camera.

In a third step 23, segment parameter extractor 142 extracts parameter values of foreground regions that have been selected in second step. In one example, an average pixel value of the pixel values of pixels in the region may be computed.

In a fourth step 24, classifier 144 classifies the foreground regions based on the extracted parameter values. Classification assigns at least part of the foreground regions to a first or second class based on the extracted parameter values. In one example, the foreground regions may be assigned to the classes by testing whether the size of the difference between an extracted parameter value of the foreground region and reference parameter values for the first and second class does not exceed a threshold. Optionally a vector containing a plurality of parameter values may be used. The classification need not be exclusive: foreground regions with a parameter value or vector that differs by more than a threshold from the reference parameter values for both classes may be left unassigned to either class. These foreground regions may correspond to the referee or a goal keeper for example. Alternatively, more than two classes may be used for classification, only the first and second class being used for subsequent detection as described in the following.

In an embodiment, predefined classes may be used. In another embodiment, the classes may be defined based on the image itself, for example by clustering. Clustering, which is known per se, may make use of a clustering quality measure for a combination of first and second reference parameter values or vectors, defined as a sum of distance measures of the extracted parameter value or vector of the foreground region to the closest of the first and second reference parameter value or vector, summed over the detected foreground regions. Clustering may be used to select a first and second (sets of) reference parameter values that minimizes such a sum. These first and second (sets of) reference parameter values may be used for assignment to the classes. In another embodiment, clustering to define the classes may be performed independent of detection in fourth step 24, e.g. periodically.

In an embodiment classifier 144 may suppress unstable classifications. For example, classifier 144 may track image positions of detected regions through successive images, and suppress a classification of a region in the current image if its image position is not located in a range of positions predicted from tracking of regions with the same classification in preceding images. In a simpler embodiment, classifier 144 may suppress a classification of a region if less than a predetermined number of successive images including the current image contains regions of the same classification within a predetermined range of positions relative to the position of the region in the current image.

In a fifth step 25, position collector 146 determines a first and second joint position for the foreground regions that have been assigned to the first and second class respectively and, in the embodiment with suppression, not suppressed. The collected position may be a median or an average of the image position of the foreground regions in the same class. In this way, the effect of false region classifications at outlying image positions is reduced. A one dimensional collected position may suffice, for example a position component along a horizontal direction in the image from first camera 10a, or a position of a projection onto a line that runs between the goals. But a two dimensional collected position may be determined.

The image position of a foreground region may be determined as an average or median of the pixel locations in the region for example. But instead the position of an arbitrary pixel in the foreground region may be used as the position of the region, or averages of maximum and minimum coordinate values in the region. This does not make a significant difference when the regions are small.

In a sixth step 26, detector 148 determines whether the first and second collected positions satisfy a predetermined condition that reflects spatial separation of the classes by the middle line of the playing field. This condition depends on the first and collected positions relative to a reference position that corresponds to the position of the middle line of the playing field.

In an embodiment the predetermined condition is a first condition that the first and second collected positions should be on different sides of the reference position, and that both the difference between the first collected position and the reference position, and the difference between the second collected position and the reference position exceed a predetermined threshold. In another embodiment, the predetermined condition is a second condition that the first and second collected positions should be on different sides of the reference position and that the difference between the first and second collected position exceeds a predetermined threshold.

In an embodiment, the predetermined condition is a third condition that the first condition (or alternatively the second condition) is met at least a predetermined fraction of the images for image time points in a time interval of predetermined duration prior to a time point of the trigger image. This makes detection more robust. Equivalently, the time interval used in the third condition may follow the time point of the trigger image, or contains images for time points before and after that of the trigger image, The predetermined time interval may have a duration of between 1 second and 20 seconds for example, and the predetermined fraction may lie between 60% and 100% for example. Detector 148 may store a result of a test whether the first condition (or the second condition) is met into a memory (not shown), for use to evaluate the third condition. Once the third condition is met, detector 148 may disable the stored result of the test whether the first condition (or the second condition) was met for the predetermined time interval.

In an embodiment, the predetermined condition is a fourth condition that is a combination of the first condition (or alternatively the second condition, or the third condition) and a fifth condition. In this embodiment, the fifth condition is that a detected amount of movement of the detected foreground regions. The amount of movement for an image time point may be detected from motion vectors representing movement of image data from a previous image, or by taking lengths of velocity vectors obtained tracking the foreground regions for example, or from an absolute value of a component of such a velocity vector or an image to image motion vectors, and summing the lengths or absolute values obtained for the different foreground regions.

In a further embodiment, the detected amount of movement may be a sum of amounts of movement for image time points during a further time interval of a predetermined length ending at the time point at which the first or second condition was detected to be met, or at the beginning of the time interval used in the third condition, if the third condition is used.

In an embodiment, the predetermined condition is a sixth condition that is a combination of the fifth condition and a seventh condition. In this embodiment, the seventh condition is that a temporal decrease in the amount of movement of the detected foreground regions between a first time point for which the fifth condition was met and a second time point a predetermined time interval (e.g. one second) prior to the first time exceeds a predetermined threshold.

If the predetermined condition used in sixth step 26 is not satisfied, the process repeats from first step 21 for a subsequent image. If the predetermined condition is satisfied, detector 148 executes a seventh step 27, using the fact that the predetermined condition was detected to make the image a trigger image. In an embodiment, detector 148 sends a command to video storage system 12 to play video data that represents images from second and/or third camera 10b,c captured during a video clip time interval that precedes the time point of reception of the trigger image. In an embodiment, video storage system 12 may be configured to use a time interval of predetermined duration at a predetermined temporal position relative to the detected time point of sixth step 26. Alternatively, video processing system 14 may be configured to select the video clip time interval. Subsequently, the process repeats from first step 21 for a subsequent image.

In an embodiment, detector 148 may be configured to suppress or qualify detection of a trigger image having indicia associated with the start of a game or game half sixth step 26. Detector 148 may also be configured to detect which side has scored and add a detection result as a qualification. As used herein a "qualification" is information stored or transmitted in association with a trigger signal identifying a trigger image.

Detection of the start of a game or game half may be performed based on the average or median positions of the foreground regions of the first and second class respectively. Trigger images may be assigned to a first or second type dependent on whether the average or median positions of the foreground regions of the first class is larger than the average or median positions of the foreground regions of the second class. A change between the first and second assigned type may be used to detect the start of a game half. In an embodiment, detector 148 is configured to determine the type for each detected trigger image and to suppress or qualify use of the image as a trigger image in response to a change of the assigned type.

Detection which side has stored can be performed based on the side of the playing field where most motion was detected in a predetermined time interval prior to the trigger image. In an embodiment, detector 148 is configured to determine the first and second amounts of motion in respective parts of the images, corresponding to respective parts of the playing field or respective goal areas, and to select an indication of the scoring side associated with each trigger image dependent on which of the first and second amounts of motion was largest in a predetermined time interval prior to the trigger image. This may be used to update a score value and/or to select information such images to be displayed in conjunction with images preceding the trigger images.

In another embodiment, detector 148 may be configured to detect which side has scored by testing a sign of the direction of movement of the average or median positions of the foreground regions of the first and second class in the predetermined time interval prior to the trigger image.

In another embodiment, detector 148 may be configured to detect which side has stored by testing whether a sum of the average or median positions of the foreground regions of the first and second class exceeds a threshold corresponding to the position of the centre line of the playing field in the predetermined time interval prior to the trigger image.

Video processing system 14 may be configured to select one or more of the 10*a-c* as a source of the images for the video clip. In an embodiment video processing system 14 may be configured to make a continuous focus selection, assigning focus to images from different ones of the cameras 10*a-c* in different time intervals (focus is used here in terms of selecting between images rather than in the optical sense). This means that for any time point one of the cameras will be assigned to have the focus. In this embodiment video processing system 14 may include, in the command to video storage system 12, an indication of the camera or cameras 10*a-c* that have the focus during the video clip time interval.

As a result of the command, video storage system 12 causes video display 16 to render video data for the selected video clip time interval as a video clip. In other embodiments, video storage system 12 may be configured to make a video clip available for display on demand e.g. using twitter, or to transmit the video clip, the video clip containing image captured in a time interval preceding the time of capture of the detected trigger image. Making the video clip available for display on demand may comprise transmitting signals to devices that are capable of rendering the video clip when the trigger image has been detected, so that the users of the devices are enabled to select to play the video clip.

In an embodiment, video storage system 12 is configured to play a background stream of video images, and to interrupt play of this backup stream to play the video clip in response to the command. The background steam may comprised pre-stored images from video storage system 12, such as commercial messages, or a stream derived from an external source, such as a TV channel, images obtained from an Internet website, or images with text received from an external source.

In the embodiment shown in FIG. 2, video storage system 12 may be configured to play a stream of images from the cameras 10*a-c* continuously, and to interrupt play of this stream to play the video clip, with earlier images from one of those cameras 10*b, c*, in response to the command. Video storage system 12 may store a combined stream that, for each time point, contains only image data representing images from the camera 10*a-c* that had the focus at that time point. In this case, it is not needed to include, in the command to play the video clip, the indication of the indication of the camera or cameras 10*a-c* that had the focus.

Alternatively video processing system 14 may be configured to send further commands to video storage system 12 to indicate focus selection during continuous play. In this case, video storage system 12 may store images from the cameras according to the commands, or store image data from all cameras 10*a-c* as well as data from the commands, for use to select images during play.

In the embodiment of FIG. 2, video processing system 14 may detect foreground regions from the images from all cameras 10*a-c*. In this case video processing system 14 may assign focus to one cameras 10*a-c* dependent on detected foreground regions from the different cameras. In this case, detection of the trigger image may make use of results that are produced as part of a continuous focus selection process. Optionally, the foreground regions may be classified, and optionally suppressed using verification by tracking as described, as part of the focus selection process. In this embodiment only foreground regions assigned to the first and second class will be used in the focus selection process. In one example, focus may be switched when video processing system 14 detects that motion has caused a count of foreground regions in an image to rise by a predetermined number.

In the embodiment wherein video processing system 14 determines focus selection during continuous play, the focus selection process provides for segmentation and optionally also classification and suppression, these intermediate steps of the focus selection process may be used as the corresponding steps in the process described using FIG. 3. Thus, only the overhead of determining the first and second collected positions and testing the predetermined condition needs to be added for selecting the video clip. However, it should be noted that other methods of focus selection may be used. Alternative methods to assign the focus are known per se.

In an embodiment, video processing system 14 may select the video clip time interval based on focus selection. For example video processing system 14 may select the end of this interval as a time of a last previous focus change to the first camera 10*a* from one of the second and third cameras 10*b,c*. A predetermined temporal length up to that end may be used in the video clip time interval for example, or a time interval from the last preceding focus change.

In an embodiment, video storage system 12 is made to play one or more further image sequences in response to detection of the trigger image, before and or after the video clip with images from cameras 10*a-c*. The one or more further video clips may comprise commercial messages for example. Video storage system 12 may be configured to respond to the command to play the video clip by retrieving the one or more further image sequences and playing them to image display 16. In another embodiment video processing system 14 includes an indication of the one or more further image sequences in the command to video storage system 12.

In a further embodiment, the one or more further image sequences are selected dependent on image processing results. This may be used to implement a selection by a sponsor to show his commercial messages only if a team of his selection has scored, or to signal which team has scored before playing the video clip.

In one embodiment, video storage system 12 stores one or more further image sequences in association with the first and second class used in the classification of the regions, e.g. in a table of such associations or stored with the one or more further image sequences. Detector 148 may be configured to select one of the first and second class with the trigger image and to indicate the selected class to video storage system 12, video storage system 12 being configured to play the one or more further image sequences associated with the indicated class, if any, in response to the command to play the video clip.

Alternatively, video processing system 14 may have a memory storing data representing such an association and detector 148 may be configured to select one or more of the further image sequences, if any, based on the selected class and its association with further image sequences, and to send a command to video storage system 12 to play the selected one or more of the further image sequences, if any.

Detector 148 may be configured to select the one of the first and second class for example by testing whether the collected position of the class is on the same side of the reference position as a side associated with one of the last of the second and third camera 10*b,c* that last had the focus before the detection of the trigger image.

In an embodiment, the definition of the classes is determined automatically, for example by clustering as described. Automated class definition makes it superfluous to use human intervention to define the first and second class for individual games. Automated class definition may be performed on an ongoing basis, not limited to trigger image detection. In an embodiment, respective class definitions determined by clustering respective different trigger images are compared. The comparison may be used to identify classes form trigger different images (by looking for the class with closest reference parameter value or vector) and/or to detect game changes (when at least one of the reference parameter value or vector differs by more than a threshold from both of the previous reference parameter values or vectors).

Although a display system has been shown by way of example, it should be appreciated that the video processing system as described could be used in other applications. For example, in a video storage application, the video processing system may be configured to control video storage system 12 to retain selectively video data for the selected video clip time interval, other video data being discarded. Discarding may take place for example when the age of the other video data is older than a predetermined buffer age. The stored data may be used as part of data that is accessible via a predetermined website for example.

In a video retrieval application, the video processing system may be configured to store identifications of selected video clip time intervals in addition to stored video data. In this case video storage system 12 may be configured to use these identifications to retrieve and play only those selected video clip time intervals when operating in a selected play mode. Other play modes may include a normal play mode wherein video data outside the selected video clip time intervals is retrieved as well, e.g. from cameras that were assigned to have the focus.

In a messaging application, the video processing system may be configured to generate a message in response to detection of the trigger image and cause a transmitter to transmit that message. A stored list of one or more target addresses may be used to provide destination addresses of the message. In a further embodiment, the video processing system may cause the selected video clip and optional one or more further image sequences to be included in the message as well.

Although the described processes may be applied to all images received from first camera 10*a*, it should be appreciated that it may suffice to use only part of the received images, for example a temporally sub-sampled sub-set of images.

Furthermore, once a first trigger image has been detected, detection of trigger images within a predetermined time distance from the first trigger image may be suppressed, or at least transmission of additional command to play the video clip based on trigger images within this time distance may be suppressed.

Although an embodiment has been described wherein the images are segmented, resulting foreground regions are classified and positions are determined for the segments, it should be appreciated that alternatively individual pixels may be classified, and the collected class positions for the first and second class may be determined as a median or average of the pixel positions that have been assigned to the first and second class respectively. This reduces computational demands at the cost of some robustness. Individual pixels may be assigned to a class based on a difference between the pixel value of the pixel and a reference pixel value for the class, or based on a difference between reference data and a data extracted from pixel values in a surrounding of the pixel location the pixel. Alternatively, foreground pixels may be selected on a pixel by pixel basis, and the selected foreground pixels may subsequently be assigned to the classes. Deviation from background depth may be used to select foreground pixels for example, by means of stereo image processing. The omission segmentation may make tracking more difficult, and thereby also suppression of unstable class assignments. However, for static image configurations, such as at kick off, tracking is not needed. Hence, suppression of an unstable class assignment to a pixel location may be realized by detecting whether the pixel location, or pixel locations in a window surrounding the pixel location, has or have the same class assignment in at least a predetermined threshold number of images in a time window that contains the current image.

Although exemplary embodiments have been described in terms of video images of a soccer match it will be appreciated that the a number of the described technical measures apply as well to the detection of separation events of other groups of objects as triggers for subsequent action. In the examples, the objects are soccer players, or more specifically areas in video images produced due to the players. But the technical measures may also be applied to video registrations of other sports that involve separation of players, like hockey, and even to separation events in other sports that do not have goal lines. Outside sports separation events of any kind of objects, e.g. during sorting of different types pellets, migration of bacteria etc, may be detected. However, the technical measures are especially effective for the properties of images that result from soccer games.

The invention claimed is:
1. An automated method of selecting a trigger image from series of images using a video processing system, the method comprising:
   capturing image streams from a plurality of cameras directed at a same playing field, for each image in a series of images from the image stream from a first camera of said plurality, processing the image using the video processing system, wherein the processing comprises:

classifying local image content from different foreground positions in the image each to one of a set of classes, based on a property of the local image content, the set of classes comprising a first and second class;

computing, by the video processing system, a first median or an average or a second first median or an average, of all different foreground positions of the local image content assigned to the first and second class in the image respectively;

using, by the video processing system, the first median or average and the second median or average as a first collected position and a second collected position for the first and second class, respectively;

detecting whether a condition is met that (a) the first and second collected positions obtained from said computing are on mutually opposite sides of a reference position and (b) either a distance between the first and second collected positions obtained from said computing, or distances between the reference position and each of the first and second collected positions obtained from said computing, exceed a threshold value;

selecting the image as the trigger image dependent on whether said condition is met, and in response to said selecting of the image as the trigger image, extracting, via the video processing system, a video clip containing only video data captured in a time interval preceding a time point at which the trigger image was captured, the time interval ending before a time point at which the trigger image was captured, the video clip containing a part of the image stream from a second camera of the plurality of cameras in said time interval.

2. A method according to claim 1, wherein the selecting the image as the trigger image by the video processing system comprises detecting whether said condition is met for at least a predetermined fraction of the images for image time points in a time interval including the trigger image.

3. A method according claim 1, further comprising determining an amount of motion related to the image using the video processing system, detecting whether a further condition is met that (c) the amount of motion is below a first threshold and/or a decrease in the amount of motion compared to a previous image exceeds a second threshold using the video processing system, and selecting the image as the trigger image using the video processing system dependent on whether said further condition is also met.

4. A method according to claim 1, further comprising determining using the video processing system whether a first sequence of the first and second collected positions along a predetermined direction in the trigger image is a reverse of a second sequence along said predetermined direction of the first and second collected positions from a previous trigger image, and suppressing or qualifying the trigger image using the video processing system dependent on a result of said determining.

5. A method according to claim 1, further comprising determining, using the video processing system, amounts of motion in first and second parts of the images for time points preceding the time point of the trigger image, the first and second parts showing different parts of a playing field, detecting via the video processing system whether the amount of motion in the first part exceeds the amount of motion in the second part or vice versa and qualifying the trigger image dependent on a result of said detection.

6. A method according to claim 1, comprising generating a combined image stream from the image streams from the plurality of cameras, by switching between cameras from the plurality based on a content of the image streams, the video clip being subsequently extracted from the combined image stream.

7. A method according to claim 1, comprising rendering the video clip on a video display, making the video clip available for display, and/or transmitting the video clip in response to selection of the image as the trigger image.

8. A method according to claim 1, comprising selectively retaining the video clip in a video storage system in response to selection of the image as the trigger image.

9. A method according to claim 1, comprising segmenting the image and deriving said image content from foreground regions identified by said segmenting using the video processing system.

10. A method according to claim 1, comprising generating a combined image stream from the image streams from the plurality of cameras by switching between cameras from the plurality based on a content of the image streams, the method comprising a camera selection process to switch between the cameras, wherein the camera selection process comprises segmenting images from image streams from each of the cameras, determining image positions of the foreground segments from the images of the image streams from each of the cameras and making switches between the camera based on the image positions, wherein the segmentation performed in of said camera selection process is used as said segmenting and determining the image positions for the trigger image from the image stream for the first camera.

11. A method according to claim 1, comprising playing the video clip and/or transmitting the video clip.

12. A video capture system, comprising a plurality of cameras, a video storage system, and a video processing system, the video processing system comprising:

an input for receiving a series of images from a first camera of said plurality of cameras;

a classifier for classifying local image content from different foreground positions in each of the images, the local image content from each different foreground position being assigned to one of a set of predefined classes, based on a property of the local image content, the set of predefined classes comprising a first and second class;

a position collector, configured to compute a first median or an average or a second first median or an average, of all different foreground positions of the local image content assigned to the first and second class in the image respectively, and to use the first median or average and the second median or average as a first collected position and a second collected position for the first and second class, respectively; and a detector configured to detect whether a condition is met that the first and second collected positions are on mutually opposite sides of a reference position and a distance between the first and second collected positions or distances between the reference position and each of the first and second collected positions exceed a threshold value, the detector being configured to issue a signal to the video storage system, upon detection the condition is met for a current image, to play a video clip, transmit the video clip and/or transmit messages to signal that the video clip is available, the video storage system being configured to include in the video clip only video data captured in a time interval preceding a time point at which the trigger image was captured, the time interval ending before a time point at which the trigger image was captured, the video clip containing a part of an image stream from a second camera captured in said time interval.

13. A video capture system according to claim 12, comprising an image segmentation module configured to segment the image in foreground areas and a background area, the classifier being configured to use, as said local image content for the classification, aggregated image data from foreground regions identified by said segmentation module.

14. A video capture system according to claim 12, the video storage system being configured to play a video clip containing images captured in a time interval preceding a time of capture of the trigger image in response to the detection that the condition is met, and/or comprises means for transmitting the video clip to devices capable of rendering the video clip in reaction to said detection and/or to transmit a signal to the devices signaling that the video clip is available in reaction to the detection.

\* \* \* \* \*